United States Patent [19]

Wassmuth et al.

[11] Patent Number: 4,880,875

[45] Date of Patent: Nov. 14, 1989

[54] THERMOPLASTIC MOLDING MATERIAL BASED ON POLYCARBONATE, ASA AND VINYLAROMATICS/AN-CONTAINING COPOLYMERS

[75] Inventors: Georg Wassmuth; Karl Ruppmich; Erhard Seiler, all of Ludwigshafen; Hermann Gausepohl, Mutterstadt; Klaus Benker, Neustadt, all of Fed. Rep. of Germany

[73] Assignee: BASF Aktiengesellschaft, Ludwigshafen, Fed. Rep. of Germany

[21] Appl. No.: 43,493

[22] Filed: Apr. 28, 1987

[30] Foreign Application Priority Data

May 9, 1986 [DE] Fed. Rep. of Germany ....... 3615607

[51] Int. Cl.$^4$ .............................................. C08L 69/00
[52] U.S. Cl. ..................................... 525/67; 524/504; 524/537
[58] Field of Search ........................................... 525/67

[56] References Cited

U.S. PATENT DOCUMENTS

| | | | |
|---|---|---|---|
| 3,130,177 | 4/1964 | Grabowski | 525/67 |
| 3,655,824 | 4/1972 | Kato et al. | 525/67 |
| 3,891,719 | 6/1975 | Schirmer et al. | 525/67 |
| 3,954,905 | 5/1976 | Margotte | 525/310 |
| 3,988,389 | 10/1976 | Margotte | 525/470 |
| 4,224,419 | 9/1980 | Swoboda | 525/71 |
| 4,526,926 | 7/1985 | Weber et al. | 525/67 |
| 4,535,124 | 8/1985 | Binsack | 525/67 |
| 4,560,725 | 12/1985 | Van Bokhoven et al. | 525/67 |
| 4,605,699 | 8/1986 | Mitulia et al. | 525/67 |
| 4,634,734 | 1/1987 | Hambrecht | 525/85 |

FOREIGN PATENT DOCUMENTS

| | | |
|---|---|---|
| 1146295 | 5/1983 | Canada . |
| 0005202 | 4/1982 | European Pat. Off. . |
| 0096301 | 12/1983 | European Pat. Off. . |
| 0135801 | 4/1985 | European Pat. Off. . |
| 1253226 | 11/1971 | United Kingdom . |

*Primary Examiner*—Patricia Short
*Attorney, Agent, or Firm*—Keil & Weinkauf

[57] ABSTRACT

A thermoplastic molding material containing, based on components A, B and C,

A from 10 to 90% by weight of one or more polycarbonates,

B from 10 to 50% by weight of one or more graft copolymers,

C from 10 to 50% by weight of one or more thermoplastic copolymers containing a vinylaromatic monomer of 8 to 12 carbon atoms and acrylonitrile, wherein component B is composed of B$_1$ a first, coarsely divided graft copolymer which has an average particle size of from 200 to 700 nm (d$_{50}$ value of cumulative molecular weight distribution) in a proportion of from 30 to 70% by weight, based on B, and B$_2$ a second, finely divided graft copolymer which has an average particle size of from 50 to 180 nm (d$_{50}$ value of cumulative molecular weight distribution) in a proportion of from 70 to 30% by weight, based on B, is used for producing moldings.

6 Claims, No Drawings

THERMOPLASTIC MOLDING MATERIAL BASED ON POLYCARBONATE, ASA AND VINYLAROMATICS/AN-CONTAINING COPOLYMERS

The present invention relates to a molding material based on polycarbonates, ASA and copolymers which contain vinylaromatics and acrylonitrile.

The relevant prior art comprises:
(1) U.S. Pat. No. 3,130,177
(2) British Pat. No. 1,253,226
(3) U.S. Pat. No. 3,655,824
(4) U.S. Pat. No. 3,891,719
(5) Canadian Pat. No. 1,191,986 and
(6) U.S. Pat. No. 4,605,699

Mixtures of styrene- and acrylonitrile-containing impact-resistant polymers with polycarbonates are described in (1) and (2). These known molding materials generally have satisfactory properties. However, frequently a higher impact resistance, a higher heat distortion resistance and in particular an improved weathering resistance are desirable. For that reason it is suggested in (3) and (4) that the resistance to light and heat is improved in molding materials which are based on polycarbonates and ASA polymers. Two-stage grafting of ASA polymers is described in (5). Also described is a blend of polycarbonates and ASA where the graft sheath of the copolymer has a two-stage structure. A further improvement is obtained according to (6) through a three-stage buildup of the graft sheath of the copolymer, in the first stage essentially styrene being grafted onto a crosslinked rubber, followed in the second stage by a mixture of styrene and acrylonitrile and in the third stage by methyl methacrylate. Frequently with these molding materials the impact resistance and heat distortion resistance do not meet the ever higher demands; but in particular the processability is unsatisfactory, and to obtain satisfactory impact resistance it is necessary to use very high processing temperatures. A further weakness of the existing molding materials is the inadequate impact resistance of injection moldings at the gate mark.

It is an object of the present invention to develop a molding material which is based on a polymer mixture containing polycarbonate and acrylate graft copolymer and which does not have these disadvantages. In particular, processing characteristics during injection molding and notched impact strength (determined by DIN 53,453) are to be improved. Furthermore, the strength of moldings at the gate is to be raised and even colored moldings are to have a satisfactory uniform appearance (no weld line marks).

We have found that this object is achieved with the molding material as hereinafter described.

The invention accordingly provides a thermoplastic molding material containing, based on components A, B and C, A from 10 to 90% by weight of one or more polycarbonates, B from 10 to 50% by weight of one or more graft copolymers, C from 10 to 50% by weight of one or more copolymers containing a vinylaromatic monomer of 8 to 12 carbon atoms and acrylonitrile, wherein component B is composed of $B_1$ a first, coarsely divided graft copolymer which has an average particle size of from 200 to 700 nm ($d_{50}$ value of cumulative molecular weight distribution) in a proportion of from 30 to 70% by weight, based on B, and $B_2$ a second, finely divided graft copolymer which has an average particle size of from 50 to 180 nm ($d_{50}$ value of cumulative molecular weight distribution) in a proportion of from 70 to 30% by weight, based on B.

In what follows, the buildup of the molding material on the basis of components A to D and the preparation of the molding material are described.

The molding material contains (is preferably composed of), in each case based on A, B ($\Sigma B_1 = B_2$) and C, the following proportions of the components mentioned:

A: from 10 to 90% by weight, preferably from 30 to 80% by weight, in particular from 45 to 70% by weight B ($B_1+B_2$): from 10 to 50% by weight, preferably from 15 to 40% by weight, in particular from 15 to 30% by weight C: from 10 to 50% by weight, preferably from 10 to 40% by weight, in particular from 15 to 30% by weight.

Based on 100 parts by weight of the molding material composed of A, B ($\Sigma B_1 + B_2$) and C, there may also be present in addition D from 0.1 to 25 parts by weight, preferably from 0.1 to 18 parts by weight, of customary additives.

Component A

The polycarbonates (component A) are known per se.

For the purposes of the molding material according to the invention, polycarbonates A are polycarbonates based on homopolycarbonates and copolycarbonates. The bisphenols can be for example: dihydroxydiphenyls, bis(hydroxyphenyl)alkanes or bis(hydroxyphenyl) ethers. However, it is also possible to use any other bisphenols suitable for the preparation of polycarbonates, such as those described inter alia in H. Schnell's monograph, Chemistry and Physics of Polycarbonates, Interscience Publishers, New York, 1964, in U.S. Pat. No. 2,999,835 and in German Laid-Open Application No. DOS 2,248,817. Particular preference is given to polycarbonates based on bisphenol A (2,2-bis(4-hydroxyphenyl)propane). The synthesis of the polycarbonates is described for example in U.S. Pat. No. 2,999,835 and British Pat. No. 772,627. Component A has a relative viscosity $\sigma_{spec/c}$ within the range from 1.1 to 1.5 (ml/g), corresponding to average molecular weights $\overline{M}_w$ within the range from 25,000 to 200,000.

Component B

Component B ($\Sigma B_1 + B_2$) is based on a first, coarsely divided graft copolymer $B_1$ and a second, finely divided graft copolymer $B_2$, the total amount of $B_1$ and $B_2$ equalling that of B.

It is essential to the invention that the two components $B_1$ and $B_2$ differ in particle size and are present together in a weight ratio of from 70:30 to 30:70. If the weight ratio is outside that range, the result is 10 a molding material which is the same as that with only one graft component B and has the disadvantageous properties described at the beginning, such as low notched impact strength and/or poor appearance of injection moldings. Further details are revealed in the Examples and Comparative Experiments.

The buildup and the preparation and the joint use not only of the coarsely divided graft copolymer $B_1$ of average particle size 200–700 nm ($d_{50}$ value of cumulative molecular weight distribution) but also of the finely divided graft copolymer $B_2$ of average particle size 50–180 nm ($d_{50}$ value of cumulative molecular weight distribution) are known per se (cf. for example German Laid-Open Application No. DOS 2,826,925).

The one-stage (cf. German Laid-Open Application No. DOS 2,826,925) and the two-stage buildup of the sheath of graft copolymers based on ASA (cf. German Laid-Open Application No. DOS 3,149,358 component B; also German Laid-Open Application No. DOS 3,414,118 component B) are also known per se.

Buildup of $B_1$ and $B_2$

The chemical buildup of the two graft copolymers $B_1$ and $B_2$ is preferably the same, although the sheath of the coarsely divided graft copolymer can in particular also have a two-stage buildup.

Thus, $B_1$ and $B_2$ are preferably each formed from ($b_1$) one or more elastomers (rubbers) which account for from 40 to 80% by weight, preferably from 50 to 75% by weight, based on ($B_1$), and are polymerized from a monomer mixture of ($b_1a_1$) from 70 to 99.9% by weight, based on ($b_1$), of one or more alkyl acrylates where alkyl is of 1 to 8 carbon atoms ($b_1a_2$) from 0 to 30% by weight, based on ($b_1$), of one or more further copolymerizable monoethylenically unsaturated monomers and ($b_1a_3$) from 0.1 to 5% by weight, based on ($b_1$), of a copolymerizable polyfunctional crosslinking monomer, and ($b_2$) a graft sheath on this elastomer, accounting for from 20 to 60% by weight, preferably from 25 to 50% by weight, based on $B_1$, and being based on ($b_2a_1$) from 50 to 90% by weight, based on $b_2$, of one or more monoethylenically unsaturated aromatic hydrocarbons of up to 12 carbon atoms and ($b_2a_2$) from 10 to 50% by weight of one or more ethylenically unsaturated monomers copolymerizable therewith. A suitable monomer for preparing elastomer ($b_1$) comprises:

($b_1a_1$) from 70 to 99.9% by weight, preferably from 70 to 99% by weight, based on ($b_1$), of an alkyl acrylate where alkyl is of 1 to 8 carbon atoms, preferably n-butylacrylate and/or 2-ethylhexyl acrylate, in particular n-butyl acrylate as sole alkyl acrylate.

($b_1a_2$) If desired, the elastomeric polymer ($b_1$) can also contain up to 30, in particular from 20 to 30, % by weight, in each case based on ($b_1$), of a further copolymerizable monomer ($b_1a_2$), such as butadiene, isoprene, styrene, acrylonitrile, methylmethacrylate and/or vinyl methyl ether.

($b_1a_3$) To obtain crosslinked acrylate polymer, the polymerization of the acrylate is carried out in the presence of from 0.1 to 5% by weight, preferably from 1 to 4% by weight, based on the total amount of monomer used in the preparation of the grafting base, of a copolymerizable polyfunctional, preferably bifunctional or trifunctional, crosslinkage-effecting monomer ($b_1a_3$). Suitable bifunctional or polyfunctional crosslinking monomers ($b_1a_3$) are those monomers which preferably contain two, or even three or more, ethylenic double bonds capable of copolymerization which are not conjugated in the 1,3-positions. Suitable crosslinking monomers are for example divinylbenzene, diallyl maleate, diallyl fumarate, diallyl phthalate, triallyl cyanate or triallyl isocyanate. A crosslinking monomer of particularly favorable utility is the acrylate of tricyclodecenyl alcohol (cf. German Pat. No. 1,260,135).

Graft copolymers $B_1$ and $B_2$ can be prepared for example by the method described in German Pat. No. 1,260,135.

The graft sheath of graft copolymers $B_1$ and $B_2$ can be built up in one or two stages, the coarsely divided product $B_1$ preferably being built up in two stages.

In the case of the one-stage buildup of the graft sheath, a mixture of monomers ($b_2a_1$) and ($b_2a_2$) is polymerized in the desired weight ratio within the range from 90:10 to 65:35 in the presence of elastomer $b_1$ in a conventional manner (cf. for example German Laid-Open Application No. DOS 2,826,925), preferably in emulsion.

In the case of a two-stage buildup of graft sheath ($b_2$), stage 1 accounts for from 20 to 70% by weight, preferably from 25 to 50% by weight, based on ($b_2$), and is prepared exclusively using monoethylenically unsaturated aromatic hydrocarbons of up to 12 carbon atoms ($b_2a_1$).

Stage 2 of the graft sheath accounts for from 30 to 80% by weight, in particular from 50 to 75% by weight, in each case based on ($b_2$), and is prepared from mixtures of the stated monoethylenically unsaturated aromatic hydrocarbons ($b_2a_1$) and monoethylenically unsaturated monomers ($b_2a_2$) in a ($b_2a_1$):($b_2a_2$) weight ratio of from 90:10 to 60:40, in particular from 80:20 to 70:30.

A monoethylenically unsaturated vinylaromatic monomer ($b_2a_1$) of up to 12 carbon atoms is for example styrene α-methylstyrene or a ring-alkylated styrene, such as p-methylstyrene, tert.-butylstyrene or a mixture thereof. It is particularly preferred to use styrene, α-methylstyrene and p-methylstyrene.

Suitable monoethylenically unsaturated copolymerizable monomers ($b_2a_2$) are acrylonitrile, alkyl (meth)acrylates where alkyl is of 1 to 4 carbon atoms, acrylic acid, maleic anhydride, acrylamide and/or vinyl methyl ether and mixtures thereof. Particular preference is given to using acrylonitrile, ethyl acrylate, methyl methacrylate and mixtures thereof. Particularly preferred monomer mixtures are, in particular, styrene and acrylonitrile, α-methylstyrene and acrylonitrile and styrene, acrylonitrile and methyl methacrylate.

In particular, in the one- or two-stage buildup of graft sheath $b_2$ in both graft copolymers $B_1$ and $B_2$, only styrene and acrylonitrile are used in a weight ratio of from 65:35 to 90:10, preferably from 70:30 to 85:15.

The ungrafted portions of (co)polymer which are formed from graft monomers ($b_2a_1$) and/or ($b_2a_2$) in the preparation of graft copolymers $B_1$ and $B_2$ are counted for the purposes of the present invention as part of components $B_1$ and $B_2$.

The graft copolymerization conditions are to be chosen in such a way that the resulting particle sizes are within the stated ranges. Measures for this purpose are known and are described for example in German Pat. No. 1,260,135 and German Laid-Open Application No. DOS 2,826,925.

Component C:

In addition to component A and the two graft copolymers $B_1+B_2$, the molding material according to the invention contains, as a further component C, a rigid component (resin) composed of one or more copolymers of one or more vinylaromatic monomers of 8 to 12 carbon atoms and acrylonitrile. The acrylonitrile content in these copolymers of rigid component C should range from 18 to 40% by weight, preferably from 20 to 36% by weight, based on the copolymer. This rigid component C does not include the free, ungrafted styrene- and acrylonitrile-containing copolymers formed during the graft copolymerization in the preparation of component B.

This rigid component C can be a styrene/acrylonitrile copolymer, an α-methylstyrene/acrylonitrile copolymer, a styrene/methyl methacrylate copolymer, a styrene/ maleic anhydride copolymer or an α-methylstyrene/styrene/ acrylonitrile, styrene/acrylonitrile/-methyl methacrylate, styrene/acrylonitrile/maleic anhydride or styrene/acrylonitrile/acrylic acid terpolymer. These copolymers can be used individually or in a mixture with one another, so that rigid component C of the mixtures according to the invention can be for example a mixture of a styrene/acrylonitrile copolymer and an α-methylstyrene/acrylonitrile copolymer. If rigid component C of the material according to the invention comprises a mixture of a styrene/ acrylonitrile copolymer and an α-methylstyrene/acrylonitrile copolymer, the acrylonitrile content of the two copolymers should ideally differ by not more than 10% by weight, preferably not more than 5% by weight, based on the copolymer.

However, rigid component C of the molding material according to the invention preferably comprises a styrene/acrylonitrile and/or an α-methylstyrene/acrylonitrile and/or a p-methylstyrene/acrylonitrile copolymer.

Rigid component C can be obtained in a conventional manner. For instance, the copolymerization of styrene and/or α-methylstyrene and/or p-methylstyrene with acrylonitrile can be carried out in substance, solution, suspension or aqueous emulsion. Rigid component C preferably has a viscosity number of from 40 to 100, in particular from 50 to 80.

Component D

The molding material according to the invention can contain, as component D, additives which are typical of and customary for polycarbonates, SAN polymers and graft copolymers based on ASA or mixtures thereof. Examples of such additives are: fillers, dyes, pigments, antistats, antioxidants, including flameproofing agents and in particular lubricants required for further processing of the molding material, for example in the production of moldings or shaped articles. Suitable lubricants are in particular the ethylene oxide and propylene oxide based Pluriols ® which are preferably employed to keep the processing properties of the molding material at a high level.

Suitable flameproofing agents are in particular the agents mentioned in German Patent Application No. P 34 36 815.9, preference being given in particular to a poly(tetrabromobisphenol-A glycidyl) ether having a molecular weight of 40,000 (product F 2400 ® from Makhteshim).

Preparation of molding material

The mixing of components A, $B_1$, $B_2$, C and, if used, D can be effected in any conventional manner. Preferably, however, components A, $B_1$, $B_2$ and C are mixed by jointly extruding, kneading or rolling the components, necessarily after they have been isolated out of the solution or aqueous dispersion obtained in the polymerization. The graft copolymerization products obtained in aqueous dispersion (components $B_1$ and ($B_2$), however, can also be partially dewatered or be directly mixed as a dispersion with component C and then with polycarbonate A and component D, in this case a graft copolymer being fully dried in the course of mixing.

The molding material is prepared for example by thoroughly mixing a melt of rigid polymers, namely component A and component C, with the graft copolymers $B_1$ and $B_2$ at over 200° C. In a preferred method of preparation, designed to obtain a particularly homogeneous distribution of the flexible phase in the rigid matrix, the precipitated graft copolymers $B_1$ and $B_2$, having a residual water content of from 10 to 40% by weight, are introduced at over 180° C. into the polycarbonate melt (component A), for example in an extruder with vacuum degassing, and thoroughly mixed in. The melt of the two rigid components A and C can also be thoroughly mixed directly at over 180° with a dispersion of the graft copolymers which have a solids content of from 30 to 60% by weight.

The molding material according to the invention can be processed in a conventional manner for thermoplastics, e.g. by extruding, injection molding, calendering, blow forming, pressing or sintering; particularly preferably the molding material prepared by the process according to the invention is injection molded to produce shaped articles for automotive construction.

The parameters described in the present invention can be determined as follows:

1. The average particle size and the particle size distribution were determined from the cumulative molecular weight distribution. The average particle size is in every case the weight average particle size as determined by means of an analytical ultracentrifuge using the method of W. Scholtan and H. Lange, Kolloid-Z. Z. Polym. 250 (1972), 782–796. Ultracentrifuge measurement provides the cumulative molecular weight distribution of the particle diameter of the sample. This reveals what weight percentage of the particles have a diameter equal to or smaller than a certain size. For the purposes of the present invention, the average particle diameter is that particle diameter, also referred to as the $d_{50}$ value of the cumulative molecular weight distribution, at which 50% by weight of the particles have a diameter smaller than the diameter which corresponds to the $d_{50}$ value. Accordingly, 50% by weight of the particles have a diameter larger than the $d_{50}$ value. To characterize the width of the particle size distribution of the rubber particles, it is possible to use, in addition to the $d_{50}$ value (the median particle diameter), the $d_{10}$ and $d_{90}$ values obtained from the cumulative molecular weight distribution. The $d_{10}$ and $d_{90}$ values of the cumulative molecular weight distribution are defined in the same way as the $d_{50}$ value, except that they relate to 10 and 90% by weight of the particles respectively. The ratio $$\frac{d_{90} - d_{10}}{d_{50}} = Q$$

constitutes a measure of the width of the particle size distribution.

2. The notched impact strength $a_k$ in [kj/m²] of the samples was measured in accordance with DIN 53,453 at 23° C. on standard bars injection-molded at 260° C.

3. The fracture energy $W_{50}$ (Nm) was measured at −40° C. in accordance with DIN 53,443, again on standard bars injection-molded at 260° C.

4. (a) The viscosity number (VN) of the polycarbonate used was measured in 0.5% strength solution in methylene chloride at 23° C.;

(b) and that of the SAN copolymers in 0.5% strength solution in dimethylformamide at 23° C.

5. The total penetration energy at the gate, $TPE_{gate}$ (Nm), was determined in accordance with DIN 53,453 on 2 mm thick 60×60 mm square sheets which had been sawn from a larger sheet injection molded at 280° C. around the gate mark. The test took place at room temperature with the impact being directed at the gate side.

6. The color was visually assessed on test boxes injection molded at 280° C. after incorporation of 1% carbon black (Black Pearl). The uniformity of color was judged on the following scale:

2=uniform coloring, no flow lines very small shimmer in black

3=uniform coloring, but somewhat stronger shimmer in hue

4=nonuniform color due to very strong shimmer in hue

5=nonuniform color due to flow marks.

To prepare molding materials according to the invention and materials for Comparative Experiments the products described hereinafter were used.

Component A

Commercially available polycarbonates based on bisphenol A, Lexan ® or Makrolon ® and having a relative viscosity (measured in 0.5% strength solution in methylene chloride) of 1.30 ml/g (A-1) or 1.33 ml/g (A-2).

Component B

Graft copolymers prepared as follows:

(a) Preparation of finely divided graft copolymer $B_2$ ($a_1$) 16 parts of butyl acrylate and 0.4 part of tricyclodecenyl acrylate were heated with stirring to 60° C. in 150 parts of water in the presence of one part of the sodium salt of a $C_{12}$-$C_{18}$-paraffinsulfonic acid, 0.3 part of potassium persulfate, 0.3 part of sodium hydrogencarbonate and 0.15 part of sodium pyrophosphate. 10 minutes after initiation of the polymerization reaction, a mixture of 82 parts of butyl acrylate and 1.6 parts of tricyclodecenyl acrylate was added in the course of 3 hours. Completion of monomer addition was followed by a further hour of reaction. The resulting latex of crosslinked butyl acrylate polymer had a solids content of 40% by weight. The (weight) average particle size was found to be 76 nm. The particle size distribution was narrow (ratio Q=0.29).

($a_2$) 150 parts of the polybutyl acrylate latex obtained in ($a_1$) were mixed with 40 parts of a mixture of styrene and acrylonitrile (weight ratio 75:25) and 60 parts of water and, after addition of a further 0.03 part of potassium persulfate and 0.05 part of lauroyl peroxide, was heated at 65° C. for 4 hours with stirring. On completion of the graft copolymerization the polymerization product was precipitated at 95° C. from dispersion by means of calcium chloride solution, washed with water and dried in a warm air stream. The degree of grafting of the graft copolymer was 35%, and the particle size 91 nm.

(b) Preparation of a coarsely divided graft copolymer (B1-1)

($b_1$) To 2.5 parts of the latex prepared in step ($a_1$) of this method were added first 50 parts of water and 0.1 part of potassium persulfate and then, in the course of 3 hours, on the one hand a mixture of 49 parts of butyl acrylate and 1 part of tricyclodecenyl acrylate and on the other a solution of 0.5 part of the sodium salt of a $C_{12}$-$C_{18}$-paraffinsulfonic acid in 25 parts of water at 60° C. Completion of addition was followed by 2 hours of polymerization. The resulting latex of crosslinked butyl acrylate polymer had a solids content of 40%. The average particle size (weight average of latex) was found to be 288 nm. The particle size distribution was narrow (Q=0.1).

($b_2$) 150 parts of this latex were mixed with 40 parts of a mixture of styrene and acrylonitrile (ratio 75:25) and 110 parts of water, and the mixture was heated with stirring, after addition of a further 0.03 part of potassium persulfate and 0.05 part of lauroyl peroxide, at 65° C. for 4 hours. The graft copolymerization product obtained was then precipitated at 95° C. from the dispersion by means of a calcium chloride solution, separated off, washed with water and dried in a warm air stream. The degree of grafting of the graft copolymer was found to be 27%, and the average particle size was 330 nm.

(c) Preparation of a coarsely divided graft copolymer (B1-2)

($c_1$) To 1.5 parts of the latex prepared in stage ($a_1$) of this Example were first added 50 parts of water and 0.1 part of potassium persulfate and then, in the course of 3 hours, on the one hand a mixture of 49 parts of butyl acrylate and 1 part of tricyclodecenyl acrylate and on the other a solution of 0.5 part of the sodium salt of a $C_{12}$-$C_{18}$-paraffinsulfonic acid in 25 parts of water at 60° C. Completion of addition was followed by 2 hours of polymerization. The resulting latex of crosslinked butyl acrylate polymer had a solids content of 40%. The average particle size (weight average of latex) was found to be 430 nm. The particle size distribution was narrow (Q=0.1).

($c_2$) 150 parts of this latex were mixed with 20 parts of styrene and 60 parts of water, and the mixture was heated with stirring, after addition of a further 0.03 part of potassium persulfate and 0.05 part of lauroyl peroxide, at 65° C. for 3 hours. The dispersion obtained in this graft copolymerization was then polymerized for a further 4 hours with 20 parts of a mixture of styrene and acrylonitrile in a ratio of 75:25. The reaction product was then precipitated at 95° C. from the dispersion by means of a calcium chloride solution, separated off, washed with water and dried in a warm air stream. The degree of grafting of the graft copolymer was found to be 35%; the average particle size of the latex particles was 510 nm.

(d) Preparation of a coarsely divided graft copolymer (B1-3)

($d_1$) A latex was prepared as described in ($c_1$).

($d_2$) 175 parts of this latex were mixed with 30 parts of a mixture of styrene and acrylonitrile (ratio 85:15) and 95 parts of water, and the mixture was polymerized with stirring for a further 4 hours after addition of a further 0.03 part of potassium persulfate and 0.05 part of lauroyl peroxide. The reaction product was then precipitation at 95° C. from the dispersion by means of calcium chloride solution, separated off, washed with water and dried. The degree of grafting of the graft copolymer was found to be 25%; the average particle size of the latex particles was 480 nm.

Component C

C-1

A monomer mixture of styrene and acrylonitrile which was polymerized in solution under customary conditions, the resulting styrene/acrylonitrile copolymer having an acrylonitrile content of 35% and a viscosity number of 80 ml/g.

C-2

An S/AN copolymer prepared in the same way as C-1, having an AN content of 25% by weight and a viscosity number of 85 ml/g.

C-3

A copolymer of α-methylstyrene and acrylonitrile prepared in a similar manner, with an AN content of 30% and a viscosity number of 55 ml/g.

The invention is illustrated in more detail by the following Examples, where the parts and percentages are by weight, unless otherwise stated.

EXAMPLES 1 TO 12 AND COMPARATIVE EXPERIMENTS A TO E

The parts by weight of components A, B ($B_1 + B_2$) and C given in the table below were in each case mixed in the dry state with an additional 0.5 part of ®Pluriol PE 3100, a linear XYX three-block copolymer based on ethylene oxide (10% by weight) and propylene oxide (90% by weight) and having a Y-block molecular weight of 950, on a fluid mixer and extruded at 250° C. on a twin-screw extruder, for example of the ZSK type from Werner & Pfleiderer. The dried granules of the samples were injection molded to produce the shaped articles for the tests. Coloring with carbon black was effected by secondary compounding with 5 parts of a 20% strength carbon black batch in PSAN.

TABLE

| Example | A-1 | A-2 | B1-1 | B1-2 | B1-3 | B2 | C-1 | C-2 | C-3 | $a_K$ (RT) | $W_{50}$ (−40° C.) | TGE gate | Color rating |
|---|---|---|---|---|---|---|---|---|---|---|---|---|---|
| Comparison | | | | | | | | | | | | | |
| A | 60 | — | 20 | — | — | — | 20 | — | — | 35 | 25 | 7 | 4 |
| B | 60 | — | — | 20 | — | — | 20 | — | — | 34 | 20 | 6 | 4 |
| C | — | 60 | — | — | 20 | — | — | 20 | — | 48 | 45 | 5 | 4 |
| D | — | 60 | — | — | — | 20 | 20 | — | — | 65 | 55 | 10 | 5 |
| E | — | 60 | — | 20 | — | — | — | 20 | — | 58 | 32 | 7 | 4 |
| Example | | | | | | | | | | | | | |
| 1 | 60 | — | 10 | — | — | 10 | 20 | — | — | 48 | 56 | 16 | 2 |
| 2 | 60 | — | — | 10 | — | 10 | 20 | — | — | 50 | 60 | 15 | 2 |
| 3 | — | 60 | 14 | — | — | 6 | 20 | — | — | 40 | 50 | 14 | 3 |
| 4 | — | 60 | — | 7 | — | 13 | 20 | — | — | 55 | 65 | 16 | 2 |
| 5 | — | 60 | — | — | 10 | 10 | 20 | — | — | 57 | 58 | 17 | 2 |
| 6 | — | 60 | — | — | 7 | 13 | — | 20 | — | 63 | 65 | 18 | 2 |
| 7 | 60 | — | 10 | — | — | 10 | — | 20 | — | 60 | 65 | 16 | 2 |
| 8 | 60 | — | — | 10 | — | 10 | — | 20 | — | 59 | 63 | 17 | 2 |
| 9 | 45 | — | — | 15 | — | 15 | 25 | — | — | 45 | 35 | 16 | 2 |
| 10 | 70 | — | — | 7.5 | — | 7.5 | 15 | — | — | 58 | 60 | 12 | 2 |
| 11 | 60 | — | — | 10 | — | 10 | 15 | — | 20 | 64 | 60 | 15 | 2 |
| 12 | 60 | — | 10 | — | — | 10 | 15 | 10 | 10 | 59 | 57 | 14 | 2 |

We claim:

1. A thermoplastic molding composition consisting essentially of the following components:

A from 45 to 70% by weight of one or more polycarbonates,

B from 15 to 30% by weight of one or more graft copolymers,

C from 15 to 30% by weight of one or more thermoplastic copolymers containing one or more vinylaromatic monomers of 8 to 12 carbon atoms and acrylonitrile, wherein component B is composed of $B_1$ a first, coarsely divided graft copolymer which has an average particle size of from 200 to 700 nm ($d_{50}$ value of cumulative molecular weight distribution) in a proportion of from 30 to 70% by weight, based on B, and $B_2$ a second, finely divided graft copolymer which has an average particle size of from 50 to 180 nm ($d_{50}$ value of cumulative molecular weight distribution) in a proportion of from 70 to 30% by weight, based on B, wherein said first, coarsely divided graft copolymer $B_1$ is formed from ($b_1$) one or more elastomers (rubbers) which account for from 40 to 80% by weight, based on ($B_1$), and are polymerized from a monomer mixture of ($b_{1a1}$) from 70 to 99.9% by weight, based on ($b_1$), of one or more alkyl acrylates where alkyl is of 1 to 8 carbon atoms ($b_{1a2}$) from 0 to 30% by weight, based on ($b_1$), of one or more further copolymerizable monoethylenically unsaturated monomers and ($b_{1a3}$) from 0.1 to 5% by weight, based on ($b_1$), of a copolymerizable polyfunctional crosslinking monomer, and ($b_2$) a graft sheath on this elastomer, accounting for from 20 to 60% by weight, based on ($B_1$), and being based on ($b_{2a1}$) from 50 to 90% by weight, based on ($b_2$), of one or more monoethylenically unsaturated aromatic hydrocarbons of up to 12 carbon atoms and ($b_{2a2}$) from 10 to 50% by weight of one or more ethylenically unsaturated monomers copolymerizable therewith, wherein said second, finely divided graft copolymer $B_2$ is formed from ($b_1$) one or more elastomers (rubbers) which account for from 40 to 80% by weight, based on ($B_2$), and are polymerized from a monomer mixture of ($b_{1a1}$) from 70 to 99.9% by weight, based on ($b_1$), of one or more alkyl acrylates where alkyl is of 1 to 8 carbon atoms ($b_1a_2$) from 0 to 30% by weight, based on ($b_1$), of one or more further copolymerizable monoethylenically unsaturated monomers and ($b_1a_3$) from 0.1 to 5% by weight, based on ($b_1$), of a copolymerizable polyfunctional crosslinking monomer, and ($b_2$) a graft sheath on this elastomer, accounting for from 20 to 60% by weight, based on ($B_2$), and being based on ($b_2a_1$) from 50 to 90% by weight, based on ($b_2$), of one or more monoethylenically unsaturated aromatic hydrocarbons of up to 12 carbon atoms and ($b_2a_2$) from 10 to 50% by weight of one or more ethylenically unsaturated monomers copolymerizable therewith.

2. A thermoplastic molding composition according to claim 1, wherein component B is prepared by conventional mixing of graft copolymer $B_1$ with $B_2$, in the presence or absence of 3. The thermoplastic molding composition of claim 1, wherein component C contains one or more copolymers each of which is composed of from 82 to 60% by weight of a monomer selected from the group consisting of styrene, alpha-methylstyrene, paramethylstyrene and mixtures thereof, and from 18 to 40% by weight of acrylonitrile.

4. The thermoplastic molding composition of claim 1, wherein component C contains one or more copolymers each of which is composed of from 82 to 60% by weight of a monomer selected from the group consisting of styrene, alpha-methylstyrene, paramethylstyrene and mixtures thereof, and from 18 to 40% by weight of acrylonitrile.

5. A thermoplastic molding composition according to claim 1, wherein the first, coarsely divided graft copolymer $B_1$, contains a graft sheath which is obtained by polymerizing a mixture of monomers ($b_2a_1$) and ($b_2a_2$) in the presence of elastomer ($b_1$).

6. A thermoplastic molding composition according to claim 1, wherein the first coarsely divided graft copolymer $B_1$ contains a graft sheath ($b_2$) which is obtained by successive polymerization of, in a first stage, from 20 to 70 percent by weight, based on ($b_2$), of a monomeric composition according to ($b_2a_1$) in the presence of elastomer ($b_1$) and of, in a second stage, from 30 to 80% by weight, based on ($b_2$), of a mixture of said ($b_2a_1$) and ($b_2a_2$) monomers in a weight ratio of from 90:10 to 60:40, respectively, and wherein said second stage is conducted in the presence of the product of the first stage.

* * * * *

UNITED STATES PATENT AND TRADEMARK OFFICE
CERTIFICATE OF CORRECTION

PATENT NO. : 4,880,875
DATED : November 14, 1989
INVENTOR(S) : Georg WASSMUTH, et al.

It is certified that error appears in the above-identified patent and that said Letters Patent is hereby corrected as shown below:

(column 11, line 21)

"presence or absence of" should read --presence or absence of components A and C--.

Signed and Sealed this

Second Day of July, 1991

Attest:

HARRY F. MANBECK, JR.

*Attesting Officer*  *Commissioner of Patents and Trademarks*